United States Patent
Puttaswamy Naga et al.

(10) Patent No.: US 9,569,742 B2
(45) Date of Patent: Feb. 14, 2017

(54) REDUCING COSTS RELATED TO USE OF NETWORKS BASED ON PRICING HETEROGENEITY

(71) Applicant: Alcatel Lucent, Boulogne-Billancourt (FR)

(72) Inventors: Krishna P. Puttaswamy Naga, San Jose, CA (US); Murali Kodialam, Marlboro, NJ (US); Matteo Varvello, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/808,133

(22) Filed: Jul. 24, 2015

(65) Prior Publication Data
US 2015/0332191 A1 Nov. 19, 2015

Related U.S. Application Data

(63) Continuation of application No. 13/597,614, filed on Aug. 29, 2012, now abandoned.

(51) Int. Cl.
*G06F 15/16* (2006.01)
*G06Q 10/06* (2012.01)
(Continued)

(52) U.S. Cl.
CPC ..... *G06Q 10/06313* (2013.01); *H04L 41/0896* (2013.01); *H04L 67/1095* (2013.01); *H04L 67/1097* (2013.01)

(58) Field of Classification Search
CPC ............ G06Q 10/06313; H04L 41/0896; H04L 67/1095; H04L 67/1097
(Continued)

(56) References Cited

U.S. PATENT DOCUMENTS 6,745,304 B2 6/2004 Playe
7,971,001 B2 6/2011 Petev et al.
(Continued)

OTHER PUBLICATIONS

M. Bhadkamkar, J. Guerra, L. Useche, S. Burnett, J. Liptak, R. Rangaswami, and V. Hristidis, "BORG: Block-ReORGanization for Self-Optimizing Storage Systems," Proceedings of the 7th Conference on File and Storage Technologies (FAST) 2009.
(Continued)

*Primary Examiner* — Viet Vu
(74) *Attorney, Agent, or Firm* — Tong, Rea, Bentley & Kim, LLC

(57) ABSTRACT

A capability is provided for reducing the costs of data transfers for networks using pricing heterogeneity. For data to be transferred between an application of a first network and a user device, the data may be transferred directly without using a second network or indirectly using a second network including a transfer of the data between the first network and the second network. In a network-based file system, a first network is primarily used for write requests and a second network is primarily used for read requests, and a data block is transferred from the first network to the second network based on a determination that a threshold number of read requests for the data block have been received. The determination as to when to transfer data between networks may be determined based on various costs associated with the networks.

16 Claims, 7 Drawing Sheets

(51) Int. Cl.
  *H04L 12/24* (2006.01)
  *H04L 29/08* (2006.01)
(58) Field of Classification Search
  USPC .......................................................... 709/213
  See application file for complete search history.

(56) References Cited

U.S. PATENT DOCUMENTS

| | | | |
|---|---|---|---|
| 8,151,094 | B2 | 4/2012 | Vera et al. |
| 8,719,627 | B2 | 5/2014 | Watson et al. |
| 2004/0268244 | A1* | 12/2004 | Levanoni .......... G06F 17/30902 715/210 |
| 2005/0071599 | A1 | 3/2005 | Modha et al. |
| 2005/0114621 | A1 | 5/2005 | Lahiri et al. |
| 2006/0075007 | A1 | 4/2006 | Anderson et al. |
| 2006/0174067 | A1* | 8/2006 | Soules ................ G06F 12/0804 711/135 |
| 2010/0153341 | A1 | 6/2010 | Driesen et al. |
| 2012/0042130 | A1* | 2/2012 | Peapell .............. G06F 12/0866 711/126 |
| 2012/0221845 | A1 | 8/2012 | Ferris |
| 2012/0310765 | A1 | 12/2012 | Masters |
| 2013/0031545 | A1 | 1/2013 | Choudhury et al. |
| 2013/0085989 | A1 | 4/2013 | Nayyar et al. |
| 2013/0110778 | A1 | 5/2013 | Taylor et al. |
| 2013/0238572 | A1 | 9/2013 | Prahlad et al. |

OTHER PUBLICATIONS

N. Megiddo and D. Modha, "ARC: A Self-Tuning, Low Overhead Replacement Cache," Proc. of Fast, 2003.
J. Wilkes, R. Golding, C. Staelin, and T. Sullivan, "The HP Autoraid Hierarchical Storage System," ACM Transactions on Computer Systems, Feb. 14, 1996.
Brocade Communications Systems, Inc, "Brocade File Lifecycle Manager (FLM) 4.0 Administration Guide," May 29, 2007.
Google, "S3 Backer, FUSE-Based Single File Backing Store Via Amazon S3," http://code.google.com/p/s3backer/wiki/ChoosingBlockSize, printed Jan. 10, 2012.
Wikipedia, "Hierarchical Storage Management, " http://en.wikipedia.org/wiki/Hierarchical storage management, printed Jan. 10, 2012.
D. Isaac, "Hierarchical Storage Management for Relational Databases," $12^{th}$ IEEE Symposium on Mass Storage Systems, 1993.
S.-H. Gary Chan and F. A. Tobagi, "Modeling and Dimensioning Hierarchical Storage Systems for Low-Delay Video Services," IEEE Transactions on Computers, vol. 52, No. 7, Jul. 2003.
Amazon, "Elasticache," http://aws.amazon.com/elasticache/, printed Jan. 10, 2012.
Amazon, "Amazon Simple Storage Service FAQS," http://aws.amazon.com/s3/faqs/, printed Jan. 10, 2012.
Amazon, "EBS to S3 Snapshot Block Size," https://forums.aws.amazon.com/message.jspa?messageID=142082, printed Jan. 10, 2012.
Microsoft, "Windows Azure Caching Service," http://msdn.microsoft.com/enus/library/windowsazure/gg278356.aspx, printed Jan. 10, 2012.
Amazon, "Amazon Elastic Block Store (EBS)," http://aws.amazon.com/ebs/, printed Jan. 10, 2012.
A. Karlin, M. Manasse, L. McGeoch, and S. Owicki., "Competitive Randomized Algorithms for Non-Uniform Problems," Proc. of SODA 1990.
Spring et al., "A Protocol-Independent Technique for Eliminating Redundant Network Traffic," SIGCOMM Proceedings of the Conference on Applications, Technologies, Architectures, and Protocols for Computer Communication, 2000, pp. 87-95, ACM, New York, NY, USA.
A. W. Leung, S. Pasupathy, G. Goodson, and E. L. Miller, "Measurement and Analysis of Large-Scale Network File System Workloads," Proc. Of the USENIX ATC, Boston, MA, 2008.
D. Narayanan, A. Donnelly, and A. Rowstron, "Write Offloading: Practical Power Management for Enterprise Storage," Proc. of Fast, 2008.
Liu, W. "Using locality and interleaving information to improve shared cache performance." 2009, (Order No. 3359458, V University of Maryland, College Park). ProQuest Dissertations and Theses, Retrieved from http://search.proquest.com/docview/304923132?accountid=14753.
Wheeler, Jim "Data Lifecycle Management: Hard Drives are not Enough," Feb. 2005, Computer Technology Review, vol. 25, Issue 2, pp. 34-35.

* cited by examiner

```
1:  for Each request do
2:     if Request is Read then
3:        Send the request to both read AND write caches
4:        Return the combined response to the user
5:     else
6:        Send the request to the write cache
7:        Return the response to the user
8:     end if
9:  end for
```

Exemplary Pseudocode 400

FIG. 4

```
1:  for Each request received do
2:     if Request is Read then
3:        if Block is invalidated then
4:           Return invalid response
5:        end if
6:        if Requested block is in cache then
7:           Return the block
8:        else
9:           Register a lease with the write cache
10:          Get updates, if any, and update the cache
11:          Fetch the block from the disk, if needed
12:          Respond with the block or invalid response
13:       end if
14:    else if Request is Update_Block then
15:       Update the appropriate block
16:    else if Request is Invalidate then
17:       Mark the block as out-of-date
18:    end if
19: end for
```

Exemplary Pseudocode 500

FIG. 5

```
1:  for Each request received do
2:     if Request is Write then
3:        Update the data block
4:        Send Invalidate request to the read cache
5:     else if Register lease request then
6:        Update the data structures
7:        Send Update_Block if the block is in cache
8:     else if Request is Read AND block in cache then
9:        Respond with data
10:       if There were k consecutive reads then
11:          Send Update_Block to read cache
12:       end if
13:    else
14:       Return invalid response
15:    end if
16: end for
```

Exemplary Pseudocode 600

FIG. 6

REDUCING COSTS RELATED TO USE OF NETWORKS BASED ON PRICING HETEROGENEITY

CROSS-REFERENCE TO RELATED APPLICATION

This application is a continuation of U.S. patent application Ser. No. 13/597,614, filed on Aug. 29, 2012, entitled REDUCING COSTS RELATED TO USE OF NETWORKS BASED ON PRICING HETEROGENEITY, which is hereby incorporated herein by reference.

TECHNICAL FIELD

The invention relates generally to networks and, more specifically but not exclusively, to transferring data between networks.

BACKGROUND

Cloud providers typically charge their cloud customers for operations that their applications perform in the cloud: input/output (I/O), storage, content delivery, and so forth. In many cases, bandwidth accounts for most of the cost associated with running an application in the cloud. Cloud customers are charged for both outgoing and incoming bandwidth, but the cost of outgoing bandwidth is typically dominant (e.g., the volume of outgoing traffic is typically greater than the volume of incoming traffic, and the cost of outgoing bandwidth is typically greater than the cost of incoming traffic).

SUMMARY

Various deficiencies in the prior art are addressed by embodiments for reducing the data transfer costs.

In some embodiments, an apparatus includes a processor and a memory communicatively connected to the processor, where the processor is configured to initiate transfer of data from a first cloud toward a second cloud based on a cost-related trigger, where the cost-related trigger is based on a cost of transferring the data from the first cloud toward the second cloud.

In some embodiments, a computer-readable storage medium stores instructions which, when executed by a computer, cause the computer to perform a method that includes initiating transfer of data from a first cloud toward a second cloud based on a cost-related trigger, where the cost-related trigger is based on a cost of transferring the data from the first cloud toward the second cloud.

In some embodiments, a method includes using a processor for initiating transfer of data from a first cloud toward a second cloud based on a cost-related trigger, where the cost-related trigger is based on a cost of transferring the data from the first cloud toward the second cloud.

BRIEF DESCRIPTION OF THE DRAWINGS

The teachings herein can be readily understood by considering the following detailed description in conjunction with the accompanying drawings, in which:

FIG. 4 depicts exemplary pseudocode for use by an end user device in utilizing the MCFS of FIG. 3;

FIG. 5 depicts exemplary pseudocode for use by a read cache in supporting the MCFS of FIG. 3;

FIG. 6 depicts exemplary pseudocode for use by a write cache in supporting the MCFS of FIG. 3;

To facilitate understanding, identical reference numerals have been used, where possible, to designate identical elements that are common to the figures.

DETAILED DESCRIPTION

In general, a capability is provided for reducing one or more costs related to use of networks (e.g., reducing the costs of data transfers for network-based applications based on pricing heterogeneity, reducing the costs of network-based storage in network-based file systems based on pricing heterogeneity, or the like, as well as various combinations thereof). A capability for reducing the costs of data transfers for network-based applications based on pricing heterogeneity is depicted and described with respect to FIGS. 1-2. A capability for reducing the costs of network-based storage in network-based file systems based on pricing heterogeneity is depicted and described with respect to FIGS. 3-7. Various other related capabilities are disclosed herein.

In some embodiments, a capability is provided for reducing the costs of data transfers for network-based (cloud) applications using pricing heterogeneity.

In at least some embodiments, when a cost of providing data from a first network (cloud) to a user is greater than a cost of transferring the data from the first network (cloud) to a second network (cloud) and providing the data to the user from the second network (cloud), the data is transferred from the first network (cloud) to the second network (cloud) and provided to the user from the second network (cloud).

In at least some embodiments, when a cost of providing data from a user to a first network (cloud) is greater than a cost of transferring the data from the user to a second network (cloud) and transferring the data from the second network (cloud) to the first network (cloud), the data is provided from the user to the second network (cloud) and transferred from the second network (cloud) to the first network (cloud).

Figure 1:
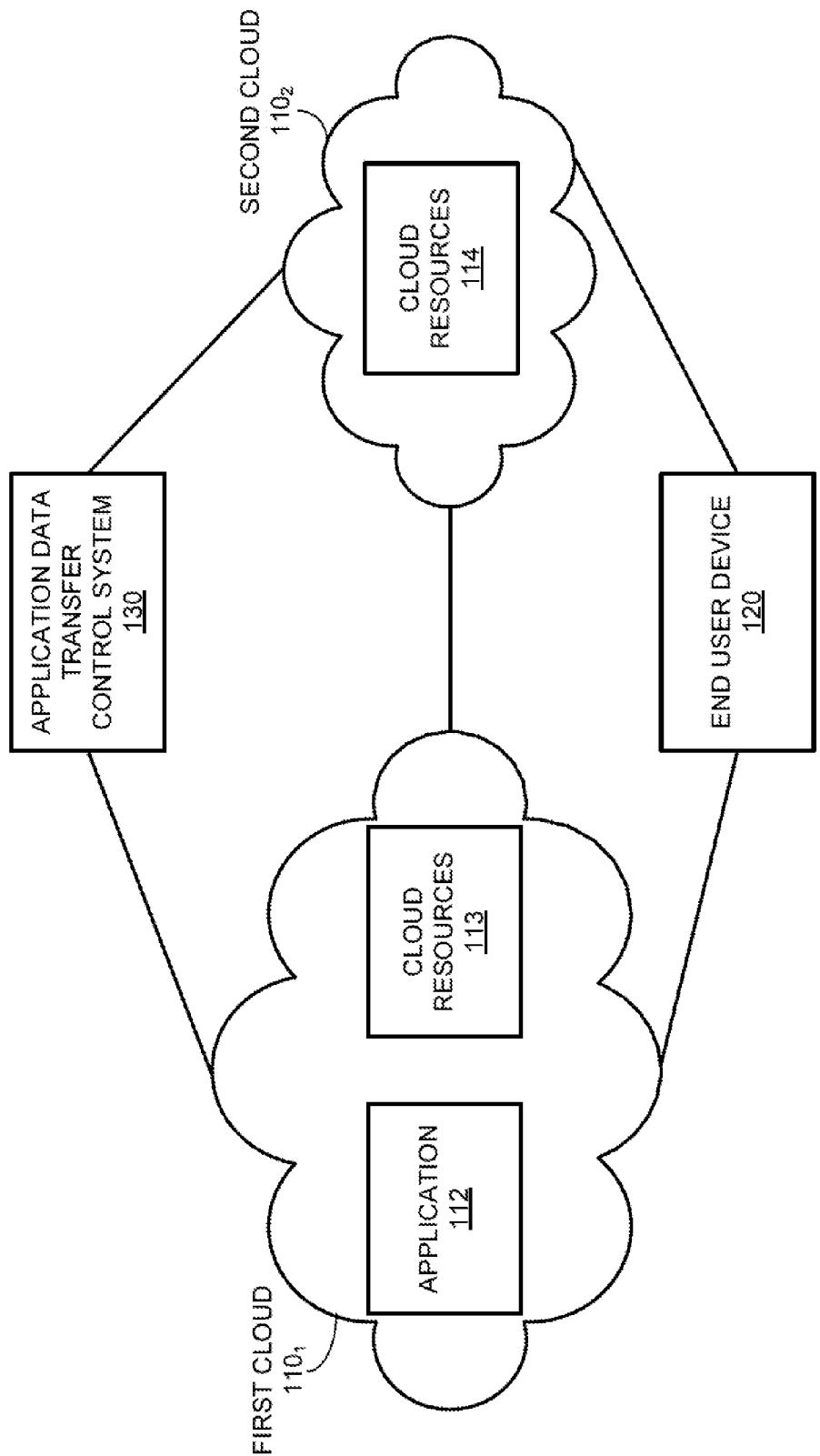
FIG. 1 depicts a high-level block diagram of an exemplary cloud-based communication system.

FIG. 1 depicts a high-level block diagram of an exemplary cloud-based communication system.

As depicted in FIG. 1, cloud-based communication system 100 includes a first cloud $110_1$ and a second cloud $110_2$ (collectively, clouds 110). The cloud-based communication system 100 also includes an application data transfer control system 130.

The first cloud $110_1$ and the second cloud $110_2$ are each capable of serving an end user device 120 (although it will be appreciated that, while a single user device 120 is depicted, each of the clouds 110 is capable of supporting a plurality of user devices). The first cloud $110_1$ and the second cloud $110_2$ may be different cloud services of a common cloud provider, different cloud services of different cloud providers, or the like. The first cloud $110_1$ and the second cloud $110_2$ may be different networks or respective portions of a common network. The end user device 120 may be any type of user device suitable for communicating with clouds 110 (e.g., a desktop computer, a laptop computer, a tablet computer, a smart phone, or the like).

The first cloud $110_1$ hosts an application 112. The application 112 may be any type of application which may be hosted within a cloud and accessed by an end user device. For example, application 112 may be a web-based application, a streaming application, a file system, or the like. The first cloud $110_1$ is configured to support communication between application 112 and user device 120, including supporting transport of incoming application data from user device 120 to application 112 and transport of outgoing application data from application 112 to user device 120. The first cloud $110_1$ is configured to support communication between the application 112 and the end user device 120, including egress communication from application 112 and ingress communication to application 112, directly (i.e., not via second cloud $110_2$). The first cloud $110_1$ is configured to support communication between the application 112 and the end user device 120, including egress communication from application 112 and ingress communication to the application 112, via second cloud $110_2$. The first cloud $110_1$ may include cloud resources 113 (e.g., computing resources, memory resources, or the like) which may be used to support communication between the application 112 and the end user device 120.

The second cloud $110_2$ is configured to support communication between application 112 and user device 120, including supporting transport of incoming application data from user device 120 to application 112 and transport of outgoing application data from application 112 to user device 120.

The second cloud $110_2$ may be configured, on-the-fly in response to one or more conditions, to support communication between application 112 and user device 120. The configuration of second cloud $110_2$ may include configuring second cloud $110_2$ to (1) in the egress direction, receive application data from application 112 via a path between the first cloud $110_1$ and the second cloud $110_2$, and propagate the application data from the second cloud $110_2$ toward user device 120 or (2) in the ingress direction, receive application data from user device 120 and transfer the application data to application 112 via a path between the second cloud $110_2$ and the first cloud $110_1$. The configuration of second cloud $110_2$ may include configuring cloud resources 114 (e.g., computing resources, memory resources, or the like) of second cloud $110_2$ to support communication between application 112 and user device 120.

The clouds 110 may be configured to employ various data transfer improvement mechanisms when transferring application data therebetween. For example, the transfer of application data between clouds 110 may be performed using one or more of redundancy elimination (RE) mechanisms, compression/decompression, or the like, as well as various combinations thereof. The use of such data transfer improvement mechanisms enables reductions in cost associated with transfer of application data between the clouds 110. These data transfer improvement mechanisms may be provided by cloud resources 113 of first cloud $110_1$ and cloud resources 114 of second cloud $110_2$.

The application data transfer control system 130 is configured to determine whether application data is exchanged between application 112 and user device 120 directly (i.e., without using second cloud $110_2$) or indirectly (i.e., via second cloud $110_2$). The application data transfer control system 130 is configured to determine whether application data is exchanged between application 112 and user device 120 directly or indirectly based on a cost analysis of costs associated with exchanging application data between application 112 and user device 120 directly or indirectly. The application data transfer control system 130 may be configured to determine whether application data is exchanged between application 112 and user device 120 directly or indirectly based on analysis of one or more performance constraints associated with exchanging application data between application 112 and user device 120 directly or indirectly.

The application data transfer control system 130 is depicted as being in communication with both the first cloud $110_1$ and the second cloud $110_2$, for purpose of illustrating that application data transfer control system 130 is able to determine and control routing of application data between application 112 and user device 120. It should be appreciated that application data transfer control system 130 may be implemented in any suitable manner. In some embodiments, as depicted in FIG. 1, application data transfer control system 130 may be implemented as a standalone system which may be accessed by first cloud $110_1$ or second cloud $110_2$ when a determination is to be made regarding routing of the application data to the end user device 120 or from the end user device 120. In some embodiments, the application data transfer control system 130 may be implemented on the communication path between the end user device 120 and the first cloud $110_1$ (e.g., for intercepting application data requests provided from user device 120 to application 112 such that a determination may be made regarding routing of the application data to the end user device 120 or from the end user device 120). In some embodiments, the application data transfer control system 130 may be implemented within the first cloud $110_1$ (e.g., for intercepting application data requests provided from user device 120 to application 112 such that a determination may be made regarding routing of the application data to the end user device 120 or from the end user device 120). It should be appreciated that various combinations of such embodiments also may be used. It is further noted that the various functions of application data transfer control system 130 may be distributed in various ways, may be deployed at least partially redundantly in various ways, or the like, as well as various combinations thereof.

In the egress direction from the application 112 toward the end user device 120, application data transfer control system 130 is configured to receive a request to transfer application data from application 112 to user device 120 and to determine whether to transfer the application data via second cloud $110_2$ based on a comparison of a cost of transferring the application data without using the second cloud $110_2$ (i.e., serving the request directly from first cloud $110_1$) and a cost of transferring the application data via the second cloud $110_2$ (i.e., transferring the application data from first cloud $110_1$ to second cloud $110_2$ and then providing the application data from second cloud $110_2$ to user device 120).

In the egress direction, the cost of transferring the application data without using the second cloud $110_2$ (also denoted herein as E_BW_orig) is the bandwidth cost of outgoing bandwidth from first cloud $110_1$ (e.g., as set by the provider of the first cloud $110_1$).

In the egress direction, the cost of transferring the application data via the second cloud $110_2$ is a sum of a data transfer cost (also denoted herein as E_BW_orig_compressed), a cost of hosting within the second cloud $110_2$ an element configured to support delivery of application data via second cloud $110_2$ (also denoted herein as E_Hosting_exitpoint), and an egress bandwidth cost (also denoted herein as E_BW_exitpoint). The data transfer cost is a combination of a cost of processing the application data at the first cloud $110_1$ for transmission to the second cloud $110_2$ (e.g., the computing cost of performing redundancy elimination (RE) processing on the application data and compressing the application data at the first cloud $110_1$) and a bandwidth cost of transferring the processed application data from the first cloud $110_1$ to the second cloud $110_2$). The cost of hosting an element within the second cloud $110_2$ is a cost of hosting, within the second cloud $110_2$, an element configured to receive the compressed and encoded application data from the first cloud $110_1$ and configured to process the application data for transmission toward the end user device 120 (e.g., by decompressing the compressed and encoded application data and decoding the decompressed encoded application data to restore the original application data to its original form before first cloud $110_1$ applied RE and compression to the application data). The egress bandwidth cost is a cost of transmitting the application data from the second cloud $110_2$ toward the end user device 120 (e.g., the bandwidth cost of outgoing bandwidth from second cloud $110_2$, as set by the provider of the second cloud $110_2$).

In some embodiments, for the egress direction, application data transfer control system 130 determines whether or not to use second cloud $110_2$ to provide the application data from application 112 to user device 120 based on evaluation of the following equation: [E_BW_orig<>E_BW_orig_compressed+E_Hosting_exitpoint+E_BW exitpoint].

In some embodiments, based on a determination that [E_BW_orig<E_BW_orig_compressed+E_Hosting_exitpoint+E_BW_exitpoint], the application data is provided from application 112 to user device 120 from first cloud $110_1$ without using second cloud $110_2$. The application 112 of first cloud $110_1$ may be instructed to propagate the application data toward the end user device 120 directly.

In some embodiments, based on a determination that [E_BW_orig>E_BW_orig compressed+E_Hosting_exitpoint+E_BW_exitpoint], the application data is provided from application 112 to user device 120 from first cloud $110_1$ via second cloud $110_2$. The application 112 of first cloud $110_1$ may be instructed to propagate the application data toward the second cloud $110_2$ (which also may include instructions to perform RE processing and compression of the application data before the application data is forwarded to the second cloud $110_2$). The application 112 of first cloud $110_1$ may be instructed to propagate the application data toward the end user device 120 indirectly via second cloud $110_2$. Also, the second cloud $110_2$ may be instructed that an exitpoint element(s) is needed in the second cloud $110_2$ for receiving application data from the first cloud $110_1$ and providing the application data toward second cloud $110_2$, such that second cloud $110_2$ may provision or activate the necessary element(s) within second cloud $110_2$.

In the ingress direction from the end user device 120 toward the application 112, application data transfer control system 130 is configured to receive a request to transfer application data from user device 120 to application 112 and to determine whether to transfer the application data via second cloud $110_2$ based on a comparison of a cost of transferring the application data without using the second cloud $110_2$ (i.e., providing the application data from user device 120 directly to the first cloud $110_1$) and a cost of transferring the application data via the second cloud $110_2$ (i.e., providing the application data from user device 120 to the second cloud $110_2$ and then transferring the application data from the second cloud $110_2$ to application 112 in first cloud $110_1$).

In the ingress direction, the cost of transferring the application data without using the second cloud $110_2$ (also denoted herein as I_BW_orig) is the bandwidth cost of incoming bandwidth to first cloud $110_1$ (e.g., as set by the provider of the first cloud $110_1$).

In the ingress direction, the cost of transferring the application data via the second cloud $110_2$ is a sum of an ingress bandwidth cost (also denoted herein as I_BW_entrypoint), a cost of hosting within the second cloud $110_2$ an element configured to support delivery of application data via second cloud $110_2$ (also denoted herein as I_Hosting_entrypoint), and a data transfer cost (also denoted herein as I_BW_orig_compressed). The ingress bandwidth cost is a cost of receiving the application data at the second cloud $110_2$ from the end user device 120 (e.g., the bandwidth cost of incoming bandwidth to second cloud $110_2$, as set by the provider of the second cloud $110_2$). The cost of hosting an element within the second cloud $110_2$ is a cost of hosting, within the second cloud $110_2$, an element configured to receive the application data and configured to encode application data using RE and to compress the encoded application data to form compressed and encoded application data. The data transfer cost is a combination of a cost of processing the application data at the second cloud $110_2$ for transmission to the first cloud $110_1$ (e.g., the computing cost of performing redundancy elimination (RE) processing on the application data and compressing the application data at the second cloud $110_2$) and a bandwidth cost of transferring the processed application data from the second cloud $110_2$ to the first cloud $110_1$).

In some embodiments, for the ingress direction, application data transfer control system 130 determines whether or not to use second cloud $110_2$ to provide the application data from user device 120 to application 112 based on evaluation of the following equation: [I_BW_orig<>I_BW_entrypoint+I_Hosting_entrypoint+I_BW_orig_compressed].

In some embodiments, based on a determination that [E_I_BW_orig<I_BW_entrypoint+I_Hosting_entrypoint+I_BW_orig_compressed], the application data is provided from user device 120 to application 112 without using second cloud $110_2$. The end user device 120 may be instructed to propagate the application data toward the application 112 directly.

In some embodiments, based on a determination that [I_BW_orig>I_BW_entrypoint+I_Hosting_entrypoint+I_BW_orig_compressed], the application data is provided from user device 120 to application 112 via second cloud $110_2$. The end user device 120 may be instructed to propagate the application data toward the application 112 indirectly via the second cloud $110_2$. Also, the second cloud $110_2$ may be instructed that an entrypoint element(s) is needed in the second cloud $110_2$ for receiving application data from the end user device 120 and providing the application data toward first cloud $110_1$, such that second cloud $110_2$ may provision or activate the necessary element(s) within second cloud $110_2$.

In at least some such embodiments, the application data transfer control system 130 may be configured to determine the costs in any suitable manner. In some embodiments, the application data transfer control system 130 may be configured to compute the costs in response to receipt of an application data transfer request. In some embodiments, the application data transfer control system 130 may be configured to compute the costs independent of receipt of application data transfer requests, such that the costs are available to the application data transfer control system 130 for use in evaluating application data transfer requests when application data transfer requests are received (e.g., the computed costs may be stored for later retrieval and use by application data transfer control system 130). In some embodiments, in the case of spot pricing (e.g., where one or more of the costs may change periodically), application data transfer control system 130 may be configured to recomputed various costs (e.g., those impacted by changes in spot pricing) periodically. Thus, when an application data transfer request is received at the application data transfer control system, the application data transfer control system 130 may compute the relevant costs, retrieve the relevant costs from one or more databases, or the like.

In at least some such embodiments, the element(s) may be provisioned within the second cloud $110_2$ in any suitable manner. In some embodiments, appropriate computing and memory resources may be allocated within the second cloud $110_2$ for handling the application data propagated via the second cloud $110_2$. In some embodiments, one or more Virtual Machines (VMs) may be provisioned within the second cloud $110_2$ for handling the application data propagated via the second cloud $110_2$. The manner in which resources of a cloud (such as cloud $110_2$) may be allocated or provisioned for handling encoding/decoding, compression/decompression, and receiving/transmitting of data will be understood by one skilled in the art.

The application data transfer control system 130 may be configured to provide various other functions of the capability for reducing the costs of data transfers for cloud applications using pricing heterogeneity.

Figure 2:
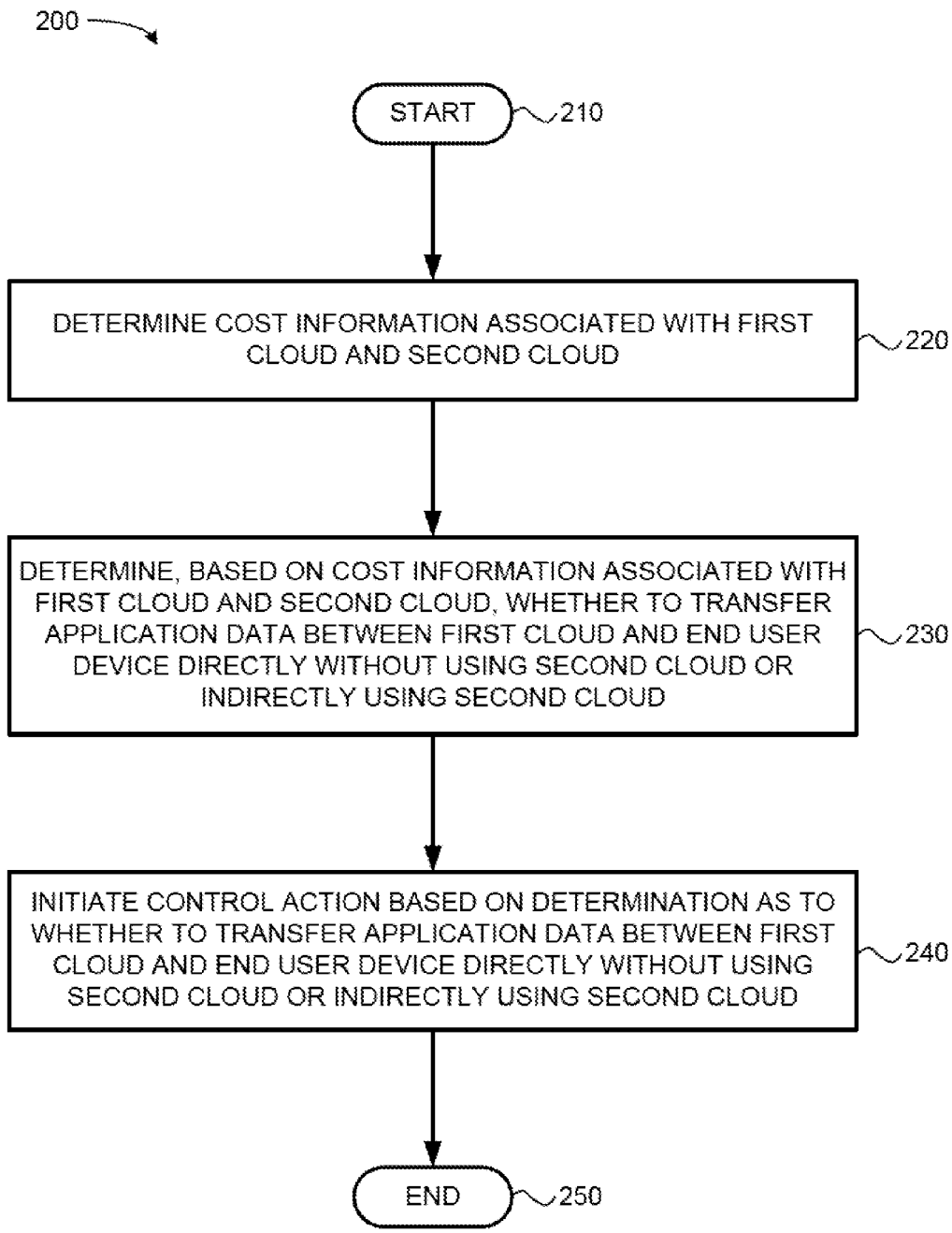
FIG. 2 depicts one embodiment of a method for determining whether to transfer application data between the first cloud and an end user device directly without using the second cloud or indirectly via the second cloud.

FIG. 2 depicted one embodiment of a method for determining whether to transfer application data between a first cloud and an end user device using a second cloud. It should be appreciated that a portion of the steps of method 200 may be performed contemporaneously, or in a different order than presented in FIG. 2.

At step 210, method 200 begins.

At step 220, cost information associated with the first cloud and the second cloud is determined.

At step 230, a determination is made, based on the cost information associated with the first cloud and the second cloud, as to whether to transfer application data between the first cloud and the end user device directly without using the second cloud or indirectly via the second cloud.

At step 240, a control action is initiated based on the determination as to whether to transfer application data between the first cloud and the end user device directly without using the second cloud or indirectly via the second cloud. The control action may include initiating one or more actions in support of the data transfer, initiating control messages to one or more elements to be involved in the data transfer, or the like, as well as various combinations thereof.

At step 240, method 200 ends.

Referring back to FIG. 1, It should be appreciated that, although primarily depicted and described with respect to embodiments in which only a single additional cloud (illustratively, cloud $110_2$) is available for use in providing application data to user device 120, in at least one embodiment multiple additional clouds may be available for use in providing application data to user device 120. In some embodiments, the application data transfer control system 130 may be configured to evaluate each of the available clouds for determining whether to provide application data to user device 120 directly (i.e., without using any of the available clouds) or indirectly (i.e., using one or more of the available clouds). In some embodiments, the application data transfer control system 130 may be configured to: (1) determine the cost of transferring application data directly using the primary cloud in which the application is hosted, (2) for each available cloud in addition to the primary cloud in which the application is hosted, determine the cost of transferring application data indirectly between the primary cloud and the end user device via the available cloud, and (3) select the cloud having the lowest associated cost for performing the data transfer.

It should be appreciated that, although primarily depicted and described herein with respect to embodiments in which transfer of data between a primary cloud and an end user device (directly or indirectly via one or more additional clouds) is performed for application data visible to an application, It should be appreciated that the application data also may include application-related data which may not be visible to the application (e.g., log files or other data that is related to the application and stored in the associated cloud in which the application is hosted).

It should be appreciated that, although primarily depicted and described herein with respect to embodiments in which transfer of data between a primary cloud and an end user device (directly or indirectly via one or more additional clouds) is performed for application data associated with an application, various other types of data may be transferred between a primary cloud and an end user device (directly or indirectly via one or more additional clouds). Thus, references herein to application data may be read more generally as references to cloud-based data or, more generally, data.

In some embodiments, a capability is provided for reducing the costs of network-based storage in network-based file systems based on pricing heterogeneity.

Figure 3:
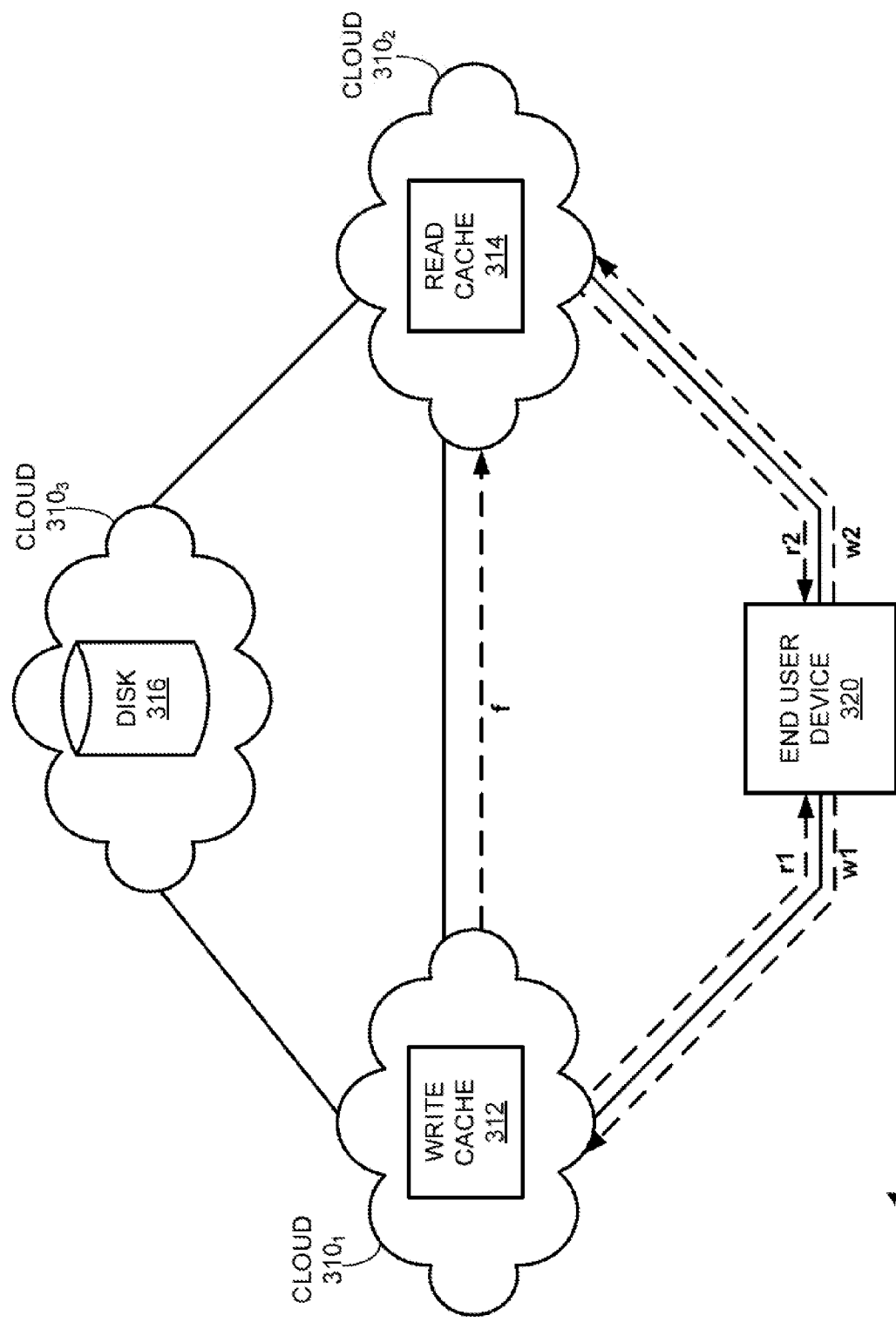
FIG. 3 depicts an embodiment of a cloud-based architecture configured to support a Multi-Cloud File System (MCFS)

FIG. 3 depicts an embodiment of a cloud-based architecture configured to support a Multi-Cloud File System (MCFS).

The cloud-based architecture includes three clouds $310_1$-$310_3$ (collectively, clouds 310) that are configured to support the MCFS, as well as an end user device 320 configured to use the MCFS via interaction with clouds 310.

The clouds 310 may include any suitable types of clouds which may be used to support a file system. The clouds 310 may be provided by one or more cloud service providers (CSPs). For example, the clouds 310 may be provided using different cloud services of one or more CSP, using cloud services of different CSPs, or the like. The clouds 310 each will include various cloud resources (e.g., computing resources, storage resources, or the like), which are omitted for purposes of clarity.

The clouds 310 are configured to support the MCFS. In general, a file system typically uses disk storage and cache storage. It will be appreciated that the disk storage of a file system stores the full set of data items of the file system, whereas the cache storage of a file system stores a subset of the data items of the file system. The cache storage may be combined storage configured to support write requests and read requests, or may be a distributed cache storage in which a write cache is generally used to handle write requests and a read cache is generally used to handle read requests. It should be appreciated that the typical operation of a write cache, a read cache, and a disk in a file system will be understood by one skilled in the art. It is further noted that, in general, disk storage has lower storage costs and higher access costs that cache storage.

The clouds 310 are configured to support the MCFS as follows: cloud $310_1$ is configured to support a write cache 312 of the file system, cloud $310_2$ is configured to the read cache 314 of the file system, and cloud $310_3$ is configured to support the disk 316 of the file system. It should be appreciated that the terms "write cache" and "read cache" used in conjunction with the MCFS may refer to cloud resources used to provide the "write cache" and "read cache" of the MCFS, respectively. It is further noted that the terms "write cache" and "read cache" used in conjunction with the MCFS may refer to one or more servers responsible for handling write requests and read requests, respectively, where, unlike a cache, such a server may be configured to store the data persistently, resize the amount of storage used (e.g., by requesting and releasing resources on demand), utilize certain types of resources (e.g., a VM with CPU and main memory), or the like, as well as various combinations thereof. In this sense, the file system components are separated and placed on different cloud services of one or more CSPs. It is further noted that the designation of the "write cache" 312 and the "read cache" 314 is based on the read costs and write costs associated with the clouds $310_1$ and $310_2$, respectively.

The clouds 310 used to host the file system components may be determined by determining a set of potential CSPs and selecting the set of CSPs used to provide the clouds 310 from the set of potential CSPs. The set of potential CSPs considered for use in hosting the file system components may include CSPs satisfying one or more criteria or may be selected from a larger group of CSPs satisfying one or more criteria. The one or more criteria may include locality criteria of the CSPs (e.g., geographic locality, network locality, or the like) which may be specified to attempt to satisfy certain levels of performance, criteria related to sets of services supported by the CSPs, criteria related to specific hardware offered by the CPSs, or the like). The selection of the set of CSPs used to provide the clouds 310 may be based on cost model information associated with the CSPs and, optionally, other criteria (e.g., criteria discussed above or other suitable types of criteria). In some embodiments, given the set of potential CSPs, the set of CSPs used to provide the clouds 310 may be selected as follows: (1) select the potential CSP having the lowest write cost to provide the write cache portion of the MCFS (i.e., the cloud of that CSP is cloud $310_1$ which is used to provide write cache 312), (2) select the potential CSP having the lowest read cost to provide the read cache portion of the MCFS (i.e., the cloud of that CSP is cloud $310_2$ which is used to provide read cache 314) and (3) select the potential CSP having the lowest storage cost to provide the disk portion of the MCFS (i.e., the cloud of that CSP is cloud $310_3$ which is used to provide disk 316). It should be appreciated that, although primarily described herein with respect to determining clouds 310 used to host the file system components by selection of CSPs used to host the file system components (e.g., where three different cloud storage services of three different CSPs are used to host the file system components), determination of the clouds 310 used to host the file system components may be performed by selecting from among cloud storage services of CSPs (e.g., determining a set of potential cloud storage service and selecting ones of the potential cloud storage services used to host the file system components).

The clouds 310 are interconnected in a mesh to enable communication between the clouds 310. This enables data items to be transferred between the write cache 312 of cloud $310_1$ and the disk 316 of cloud $310_3$, between the read cache 314 of cloud $310_2$ and the disk 316 of cloud $310_3$, and between the write cache 312 of cloud $310_1$ and the read cache 314 of cloud $310_2$. The interconnection of the clouds 310 may be provided using any suitable type(s) of communication network(s).

The end user device 320 may be any user device which may interact with a cloud-based file system such as MCFS. For example, end user device 320 may be a desktop computer, a laptop computer, a tablet computer, a smart phone, or the like. As depicted in FIG. 3, end user device 320 is configured to communicate with the write cache 312 of cloud $310_1$ and with the read cache 314 of cloud $310_2$.

In the MCFS provided by the clouds 310, there are various costs that are associated with use of the MCFS by end user device 120. For the write cache 312 of cloud $310_1$, for example, there is a per-operation write cost ($w_1$) for writing to the write cache 312 and a per-operation read cost ($r_1$) for reading from the write cache 312. For the read cache 314 of cloud $310_2$, for example, there is a per-operation read cost ($r_2$) for reading from the read cache 314 and a per-operation write cost ($w_2$) for reading writing to the read cache 314. Also, there is a transfer cost (f) for transferring from the write cache 312 to the read cache 314. It should be appreciated that the various read costs and write costs associated with the MCFS may include various types of costs associated with reading and writing of data blocks in a cloud-based file system, such as I/O costs, computing costs, bandwidth costs, or the like, as well as various combinations thereof. It is further noted that each of the costs may be based on a block of a particular size (e.g., 4 KB, 8 KB, or the like).

In the MCFS, instead of immediately transferring an updated data block from the write cache 312 to the read cache 314, the updated data block is transferred from the write cache 312 to the read cache 314 after k contiguous reads of the updated data block. By identifying an appropriate value of k, the costs of the reads and writes can be reduced below the cost of either running completely on the read cache 314 or completely on the write cache 312. This may be better understood from a simple example. For example, consider a scenario in which there are 50 contiguous writes followed by 50 contiguous reads, and a data block that is updated is transferred from the write cache 312 to the read cache 315 only after 5 contiguous reads. In this example, the total cost in MCFS is $50*w_1+5*r_1+f+45*r_2$, which is $50*1+5*1.46+11.46+45*1=113.76$. By contrast, if this were to run completely on the read cache 314, the cost would be $50*w_2+50*r_2$, which is $50*10+50*1=550$. Similarly, if this were to run completely on the write cache 312, the cost would be $50*r_1+50*w_1$, which is $50*1.46+50*1=123$. It should be appreciated that this example is based on assumptions that $w_1=1$, $r_1=5$, $w_2=10$, $r_2=1$, and $f=11.46$, which are examples of expected costs, normalized for purposes of computation, associated with certain existing CSPs. Thus, use of MCFS is better than running exclusively on the cloud $310_1$ associated with the write cache 312 or the cloud $310_2$ associated with the read cache 314. A problem associated with choosing the value of k is that there is no a priori knowledge regarding the number of read operations or write operations following a write operation and, thus, the value of k should be chosen without prior knowledge of the types of operations that will follow a write operation (while also adapting the write cache 312 and the read cache 314, including the pricing of the write cache 312 and the read cache 314). For purposes of describing the operation of end user device 120, read cache 314, and write cache 312, it is assumed that the value of k is chosen appropriately. It should be appreciated that, for the processes described for operation of end user device 120, read cache 314, and write cache 312, an assumption is made that a single data block is written and read per I/O operation (for the sake of simplifying the description of the processes).

In the MCFS, the handling of data block requests using clouds 310 is performed using processes associated with end user device 320, read cache 314, and write cache 312, respectively.

The end user device 320 is configured to use the MCFS. The end user device 320 is configured to send requests associated with data blocks (e.g., read requests for reading data blocks and write requests for writing data blocks). The end user device 320 is configured to send write requests to write cache 312 and to send read requests to both the read cache 314 and the write cache 312. The read requests are propagated to the write cache 312 to fetch the updated data in cases where it has not yet been propagated to the read cache 314 (i.e., the number of reads for the data is less than k). It should be appreciated that in an alternative embodiment, the end user device 320 does not send the read request to the write cache 312, rather, the read cache 314 is configured to transparently redirect read requests to the write cache 312 if the write cache 312 if the write cache 312 has the latest copy (although this will increase the latency such that it is greater than 1 round trip time (RTT)). The appropriate cache then returns the response to the end user device 320. The configuration of the end user device 320 to support write requests and read requests may be implemented as depicted in the exemplary pseudocode of FIG. 4. As depicted in FIG. 4, the exemplary pseudocode 400 for end user device 320 supports handling of read requests (specified in lines 2-4) and write requests (specified in lines 5-7).

Referring back to FIG. 3, the read cache 314 is configured to process requests in the MCFS. The read cache 314 stores recently read data blocks. The read cache 314 is configured to process read requests from end user device 320, requests from the write cache 312 to invalidate data blocks, and requests to update the contents of data blocks.

The read cache 314 is configured to receive, from end user device 320, a read request for a data block. If the data block has been invalidated by the write cache 312, an indication of invalidation of the data block is sent to the end user device 320 so that the end user device 320 may retrieve the data block from the write cache 312. If the data block is present in the read cache 314 and valid, the read cache 314 provides the requested data block to the end user device 320. If the data block is new to the read cache 314, the read cache 314 may register a lease with the write cache 312 and (a) if the data block is present in the write cache 312 then the read cache 314 replies to the end user device 320 with information indicative that the data block is present in the write cache 312 such that the end user device 320 may then send a read request for the data block to the write cache 312 or (b) if the data block is not present in the write cache 312, then the data block is obtained from the disk 316 and provided to the end user device 320. The lease that is sent from the read cache 314 to the write cache 312 for the data block indicates that the read cache 314 is interested in learning about updates to the data block (e.g., the read cache 314 is requesting that the write cache 312 send an invalidate update message to the read cache 314 each time that the data block is updated at the write cache 312). It should be appreciated that the read cache 314 may not be interested in updates for all data blocks as some data blocks may be write-insensitive.

The read cache 314 is configured to receive, from write cache 312, a request to invalidate a data block. This request is sent from the write cache 312 to the read cache 314 when the data block is written. This request indicates that future accesses to the data block should be for the updated data block which is currently cached in the write cache 312. The read cache 314, upon receiving the request to invalidate the data block, marks the data block in a manner for indicating that the data block has been invalidated. In some embodiments, the read cache 314 may send an indication of invalidation of the data block to the end user device 320 at the time that the data block is invalidated, such that the end user device 320 is preemptively made aware of invalidation of the data block and can direct the next read request for the data block to the write cache 312, thereby reducing latency. In some embodiments, which may reduce the overhead at the expense of latency, the read cache 314 does not send an indication of invalidation of the data block to the end user device 320 at the time that the data block is invalidated, but, rather, waits until a next request for the data block is received, at which time the read cache 314 responds to the end user device 320 in a manner for instructing the end user device 320 to request the data block from the write cache 312 (e.g., with an indication that the data block has been invalidated and that the end user device 320 needs to send a read request for the data block to the write cache 312).

The read cache 314 is configured to receive, from write cache 312, a request to update the contents of a data block. This request is sent from the write cache 312 to the read cache 314 when the write cache determines that it is optimal to serve the data block from the read cache 314 (e.g., when the number of contiguous read requests for the data block after a write request for the data block is greater than k). The data block may be provided from the write cache 312 to the read cache 314 such that subsequent requests for the data block may be served from the read cache 314 rather than from the write cache 312.

The configuration of the read cache 314 to support such requests may be implemented as depicted in the exemplary pseudocode of FIG. 5. As depicted in FIG. 5, the exemplary pseudocode 500 for read cache 314 supports handling of read requests (specified in lines 2-13), requests to invalidate data blocks (specified in lines 14-15), and request to update contents of data blocks (specified in lines 16-17).

Referring again to FIG. 3, the write cache 312 is configured to process requests in the MCFS. The write cache 312 stores recently written data blocks. The write cache 312 is configured to process write requests from end user device 320, requests from the read cache 314 to register leases for data blocks, and read requests from end user device 320.

The write cache 312 is configured to receive, from end user device 320, a write request for a data block. The updated data block is written to the write cache 312 and an invalidate message is sent from the write cache 312 to the read cache 314 if the read cache 314 has registered a lease for that data block.

The write cache 312 is configured to receive, from read cache 314, a request to register a lease for a data block. The appropriate data structures of the write cache 212 are updated, and the data block is invalidated in the read cache 314 if it is written in the write cache 312 and not yet flushed to disk 316.

The write cache 312 is configured to receive, from end user device 320, a read request for a data block. If the data block is present in the write cache 312, the write cache 312 provides the data block to the end user device 320. If the data block is not present in the write cache 312, the write cache 312 sends an "invalid request" message to the end user device 320. The end user device 320, upon receiving the "invalid request" message from the write cache 312, then sends a read request for the data block to the read cache 314, which then sends the data block to the end user device 320 (e.g., by fetching the data block from the read cache 314 when the data block is present in the read cache 314 or fetching the data block from the disk 316 when the data block is not present in the read cache 314).

The write cache 312 also is configured to monitor the number of read requests received for a block following receipt of a write request for the data block. The write cache 312 is configured to send a data block to the read cache 312 based on a determination that k contiguous read requests for the data block are received after a read request is received for the data block. As noted above, this is due to the fact that it will be cheaper to serve the read requests from the read cache 314 in the future.

The configuration of the write cache 312 to support such requests may be implemented as depicted in the exemplary pseudocode of FIG. 6. As depicted in FIG. 6, the exemplary pseudocode 600 for write cache 312 supports handling of write requests (specified in lines 2-4), requests to register leases for data blocks (specified in lines 5-7), read requests (specified in lines 8-9), and a determination as to whether to transfer a data block to the read cache 314 (specified in lines 10-12).

Referring again to FIG. 3, it should be appreciated, from the foregoing discussion of the operation of the MCFS, that the operation of the MCFS is dependent upon the value of k that is used to control transfers of data blocks from write cache 312 to read cache 314. In analyzing determination of values of k, It should be appreciated that the overhead of sending invalidation messages from the write cache 312 to the read cache 314 is relatively low, because the invalidation messages are relatively small in size, can be stored in main memory, and only periodically need to be written to the disk for recovery. As a result, the cost incurred from sending such invalidation messages is negligible when compared to the cost of serving data. In some embodiments, a deterministic process for determining when to transfer a data block from the write cache 312 to the read cache 314 is provided. In some embodiments, a probabilistic process for determining when to transfer a data block from the write cache 312 to the read cache 314 is provided. These processes may be better understood by first considering certain characteristics of the MCFS of FIG. 3.

In the MCFS, assume that all of the files (and their associated data blocks) are stored on the disk 316, and that there are two clouds (of different CSPs) on which the write cache 312 and the read cache 314 are instantiated. In the MCFS, assume that the cost of one read (write) operation on the write cache 312 is $r_1$ ($w_1$) and that the cost of one read (write) operation on the read cache 314 is $r_2$ ($w_2$). These costs per access include any bandwidth costs that are incurred (which may be based on block size).

Figure 7:
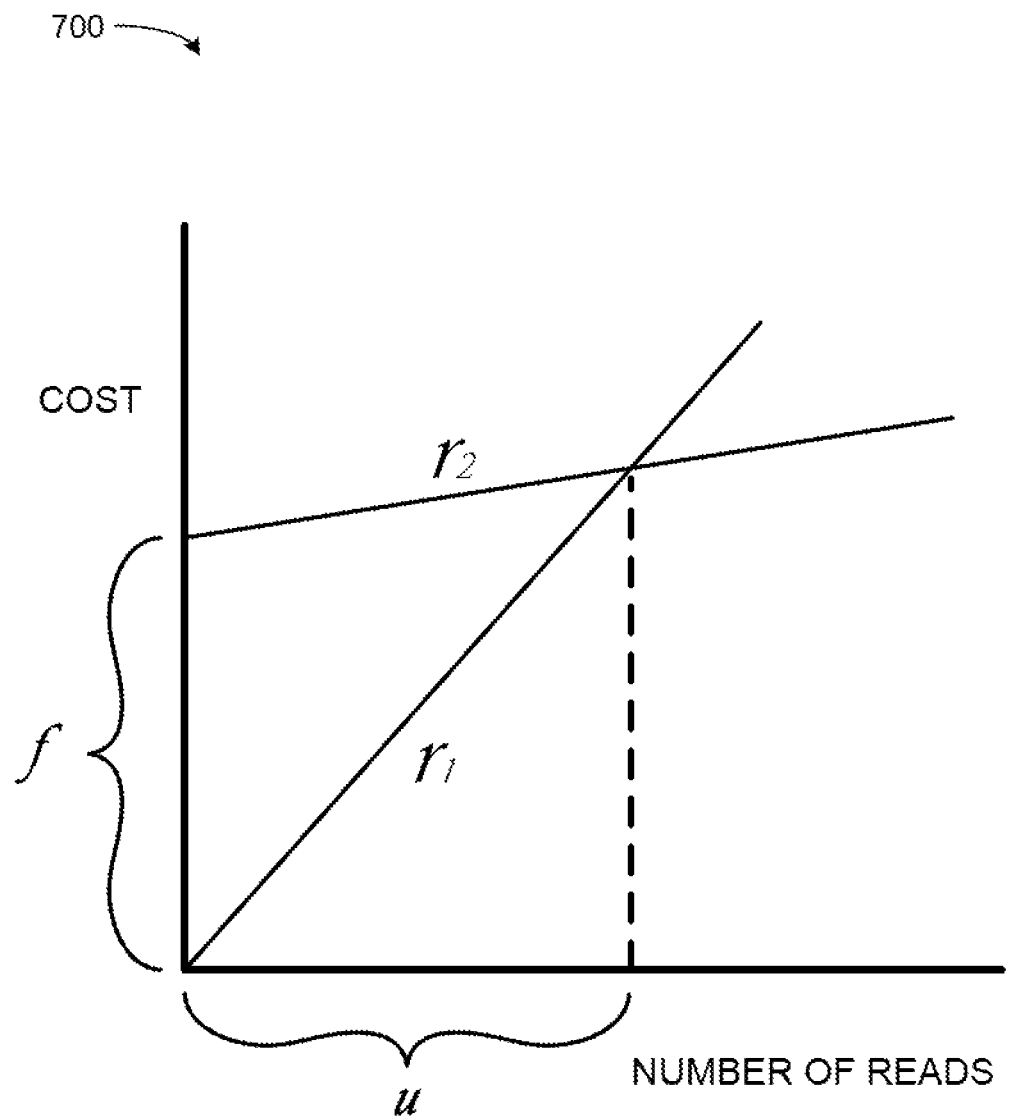
FIG. 7 depicts a model illustrating the read costs associated with the write cache and read cache of FIG. 3.

In the MCFS, assume that $w_1 < w_2$ and that $r_1 > r_2$. It should be appreciated that β is used to represent the ratio of $r_2$ to $r_1$ (i.e., β is less than one). This model, illustrating the read costs associated with the write cache 312 and the read cache 314 is depicted in FIG. 7. In FIG. 7, the number of reads for a data block is plotted on the x-axis and the cost of the reads is plotted on the y-axis. As the number of read operations increases (on the x-axis), the cost due to $r_1$ (represented by a first curve in the graph) increases faster than the cost due to $r_2$ (represented by a second curve in the graph), but use of read cache 314 requires an initial investment of f. The plot (line) associated with write cache 312 and the plot (line) associated with read cache 314 intersect each other at u read operations.

In the MCFS, there can be a difference between the per unit time storage costs at the write cache 312 and the read cache 314. It is expected that the difference in the storage costs between the cloud $310_1$ and the cloud $310_2$ is relatively small when compared to the difference in access costs between the between the cloud $310_1$ and the cloud $310_2$. Accordingly, for purposes of simplifying the discussion, the difference in storage costs is ignored and the difference in access costs is considered. For the purposes of this discussion, a transfer is defined as the action of transferring a data block from the write cache 312 to the read cache 314. Any transfer from the write cache 312 to the read cache 314 will involve reading from the write cache 312 and writing into the read cache 314. This incurs a cost of $f = r_1 + w_2$. When a data block is accessed for the purpose of making changes, the following is the sequence of operations that may be performed: (1) the data block is copied from the disk (via the read cache) and a local copy of the data block is made at the end user device 320, (2) after the changes to the data block are complete, the data block is written into the write cache 312, (3) any read operation on the block will be done from the write cache 312, (4) at any point in time the data block can be transferred from the write cache 312 to the read cache 314, (5) once the data block is transferred from the write cache 312 to the read cache 314, all read operations are served from the read cache 314, and (6) if the data block is further modified via the end user device 320, the data block is written into the write cache 312 and the copy that is in the read cache 314 is invalidated. Thus, any write operation is a new starting point. In order to illustrate the manner in which the value of k may be determined, the process that is performed between two write operations on a data block is further considered. During the time that the data block is in the write cache 312, any read operations on the data block are served out of the write cache 312. If there are a relatively large number of read operations between the write operations, then it might be more cost effective to transfer the data block from the write cache 312 to the read cache 314 (from which reading of the data block is cheaper, because $r_2 < r_1$). Thus, as noted above, the decision to transfer a data block from the write cache 312 to the read cache 314 depends on the number of read operations for the data block between two write operations for the data block. It should be appreciated that the cost of the disk read in step (1) listed above may, in some cases, be more than the cost of reading the data block from the write cache 312; however, the number of disk reads is relatively small as compared to reads from the working set and the disk cost can be managed well using relatively large block sizes and, thus, this cost is ignored for the purposes of simplifying the modeling for determining the value of k.

In some embodiments, given that the number of read operations for a data block between two write operations for the data block is not known in advance, an online process is provided for determining, based on the current number of read operations for the data block (without any knowledge of the future) if and when to initiate a transfer of a data block from the write cache 312 to the read cache 314. The performance of an online process may be given as the ratio of the cost incurred by the online process to that of an offline process that has knowledge of the future. The performance ratio depends on the number of read operations between two write operations. Let ONLINE(k) denote the cost of the online process if there are k read operations between two write operations and let OFFLINE(k) denote the corresponding cost of the offline process where the where the value of k is known. The worst case competitive ratio of the online algorithm (denoted by θ) is given by:

$$\theta = \max_k \frac{ONLINE(k)}{OFFLINE(k)}.$$

In the offline process, as noted above, the value of k is known in advance. If there are k read operations between two write operations, then reading the data block from the write cache 312 will incur a cost of $r_1 k$. If the data block is instead transferred into the read cache 314 before reading, then the cost will be $f+r_2 k$. Thus, if $$k \le \frac{f}{r_1 - r_2},$$

then it is more cost effective to keep the file in the write cache 312 than in the read cache 314. By contrast, if $$k > \frac{f}{r_1 - r_2},$$

then it is more cost effective to transfer the file from the write cache 312 to the read cache 314 when the write operation is complete. As noted above, however, the problem is that the value of k is not known in advance and, thus, it is necessary to determine if and when to transfer a data block from the write cache 312 to the read cache 314 in order to reduce (and, in at least some cases, minimize) cost.

In some embodiments, a deterministic process is used to determine if and when to transfer a data block from write cache 312 to read cache 314. The transfer of a data block from the write cache 312 to the read cache 314 may be performed after a fixed number of read operations. Let $$u = \frac{f}{r_1 - r_2}$$

represent the crossover point (as depicted in FIG. 7) where the cost of using the write cache 312 or the read cache 314 is the same. Assume that the data block is held in the write cache 312 until there are u reads, at which point the data block is transferred from the write cache 312 to the read cache 314 and all further reads (until the next write operation for the data block) are from the read cache 314. If the number of read operations is l<u, then the competitive ratio is one. If the number of read operations is l=u, then the optimal cost is $r_1 u$ and the cost of the online process where the data block is transferred from write cache 312 to read cache 314 after u read operations is given by (r1)u+f, such that the competitive ratio is $$\frac{r_1 u + f}{r_1 u} = 1 + \frac{f}{r_1 u} = 2 - \frac{r_2}{r_1} = 2 - \beta, \text{ where } \beta = \frac{r_2}{r_1} < 1.$$

If the number of read operations is l>u, then the competitive ratio is even better. It should be appreciated that it is possible to show that no purely-deterministic process is able to provide a competitive ratio better than 2–β. The competitive ratio of the deterministic process, however, can be improved by using a probabilistic transfer of the data block at u rather than automatically initiating a transfer of the data block at u.

In the case of probabilistic transfers, there is a probability (φ) that the data block is transferred from write cache 312 to read cache 314 at u and a corresponding probability (1–φ) that the data block is not transferred from write cache 312 to read cache 314 at u. If l<u, the competitive ratio is one. If l=u the competitive ratio is $$\frac{(r_1 u + f)\phi + (r_1 u(1 - \phi))}{r_1 u} = 1 + \phi(1 - \beta). \text{ If } l > u,$$

the competitive ratio is $$\frac{(1 - \phi)r_1 l + \phi[r_1 u + f + r_2(l - u)]}{f + r_2 l}.$$

It may be shown that the competitive ratio is maximized when l→∞ which gives a competitive ratio of $$\frac{1 - \phi}{\beta} + \phi.$$

Since, in at least some embodiments, it is desirable to minimize the worst case competitive ratio, the performance of the cases in which l=u and l>u may be equated to obtain the following equation:

$$\frac{1 - \phi}{\beta} + \phi = 1 + \phi(1 - \beta).$$

Solving this equation for φ result in $$\phi = \frac{1}{1 + \beta}$$

and an expected competitive ratio of $$\frac{2}{1 + \beta}.$$

It should be appreciated that this expected competitive ratio may be improved even further by using a fully probabilistic transfer process to determine transfer of a data block from the write cache 312 to the read cache 314.

In some embodiments, a probabilistic process is used to determine if and when to transfer a data block from the write cache 312 to the read cache 314. Let p(y) represent the probability that the transfer of the data block from the write cache 312 to the read cache 314 is done after y reads of the data block. Assume that there are l arrivals to the system. The expected cost is given by $\int_0^l [r_1 y + f + r_2(l-y)] p(y) dy + \int_l^u r_1 l p(y) dy$, where the first term in the integral is the expected cost if the data transfer is done before arrival l and the second term in the integral is the expected cost if the transfer is done after l arrivals. It is assumed that that the data transfer (if it is done) is performed on or before u reads of the data block. If the number of reads l≤u, then the optimal cost is $r_1 l$. If $\theta$ is the expected competitive ratio, then it is desirable for $\theta r_1 l = \int_0^l [r_1 y + f + r_2(l-y)] p(y) dy + \int_l^u r_1 l p(y) dy$. Differentiating both sides with respect to l gives $\theta r_1 = f p(l) + r_2 \int_0^l p(y) dy + r_1 \int_l^u p(y) dy$, and differentiating again with respect to l gives $f p'(l) - (r_1 - r_2) p(l) = 0$. This equation may be rewritten as $$p'(\ell) - \frac{1}{u} p(\ell) = 0.$$

The solution to the differential equation is $$p(y) = K e^{\frac{1}{u} y}.$$

If an assumption is made that the transfer is done by u reads with probability $\phi$, this gives $$\int_0^u p(y) dy = \int_0^u K e^{\frac{1}{u} y} = \phi.$$

Solving this equation for K gives $$K = \frac{\phi}{u(e-1)}$$

and, therefore, $$p(y) = \frac{1}{u(e-1)} e^{\frac{1}{u} y}.$$

Setting l=0 in $\eta r_1 = f p(l) + r_2 \int_0^l p(y) dy + r_1 \int_l^u p(y) dy$ gives $\theta r_1 = f p(0) + r_1 \phi$. Evaluating p(0) in $$p(y) = \frac{1}{u(e-1)} e^{\frac{1}{u} y}$$

gives $$\theta = \phi \left( 1 + \frac{f}{r_1 u(e-1)} \right) = \phi \left[ \frac{e - \beta}{e - 1} \right].$$

This is the competitive ratio if l≤u. On the other hand, when l>u, the competitive ratio for this scheme is achieved when l→∞ as in the case when l>u in the deterministic transfer process (i.e., the competitive ratio is $$\frac{1 - \phi}{\beta} + \phi.$$

Evaluating the two competitive ratios gives $$\phi \left[ \frac{e - \beta}{e - 1} \right] = \frac{1 - \phi}{\beta} + \phi,$$

such that solving for $\phi$ gives $$\phi = \frac{e - 1}{e - 1 + \beta(1 - \beta)}.$$

Then, calculating the value of $\theta$ gives $$\theta = \frac{e - \beta}{e - 1 + \beta(1 - \beta)}.$$

In some embodiments, the probabilistic process for determining when to transfer a data block from the write cache 312 to the read cache 314 includes steps of: (1) with probability $$\phi = \frac{e - 1}{e - 1 + \beta(1 - \beta)},$$

the transfer point (in terms of number of read operations on the data block) at which the data block is transferred from write cache 312 to read cache 314 is generated between zero and u from an exponential distribution having a density function of $$\frac{1}{u(e-1)} e^{\frac{1}{u} y},$$

(2) with probability $1-\phi$, the data block is not transferred from write cache 312 to read cache 314 (e.g., the transfer point is set to a large number), and (3) if the number of read operations on the data block reaches the transfer point, the data block is transferred from the write cache 312 to the read cache 314 and all further read operations are handled from the read cache 314 until the next write operation is performed on the data block (at which point the data block is back in the write cache 312 and the process of generating the transfer point can be repeated).

It should be appreciated that, although the probabilistic process has a better worst case competitive ratio than the deterministic process, on any given trace it is possible for the deterministic process to outperform the probabilistic process. This is due to the fact that if there are not too many reads between writes (e.g., less than u reads of the data block between two writes of the data block), then the deterministic process is optimal but the probabilistic process still has an expected competitive ratio given by $$\theta = \frac{e - \beta}{e - 1 + \beta(1 - \beta)}.$$

It should be appreciated that, although primarily depicted and described herein with respect to embodiments in which an assumption is made that the costs associated with handling of a data block for a client are uniform for different client types, in at least one embodiment one or more of the costs associated with handling of a data block for a client may be different for different client types (e.g., one or more costs may be different when the client is end user device 320 than when the client is one of the clouds 310). For example, a read cost associated with reading of a data block from a cloud 310 may vary depending on whether the client for which the data block is read is an end user device (illustratively, end user device 320) or a cloud (e.g., read cloud $310_2$ where the data block is read from write cloud $310_1$ for transfer to read cloud $310_2$). Similarly, for example, a write cost associated with writing of a data block into a cloud 310 may vary depending on whether the client for which the data block is written is an end user device (illustratively, end user device 320) or a cloud (e.g., read cloud $310_2$ where the data block is transferred to read cloud $310_2$ from write cloud $310_1$ and written into read cloud $310_2$). It should be appreciated that such differences in a cost may be due to differences associated with any of the cost components from which the cost may be determined (e.g., different I/O costs for different client types, different computing costs for different client types where computing resources are used, different bandwidth costs associated with transfer of the data block to different client types), or the like, as well as various combinations thereof. Thus, the value of f associated with transfer of a data block from the write cloud $310_1$ to the read cloud $310_2$ may be written more generally as f=[cost of reading from the write cloud $310_1$+cost of writing to the read cloud $310_2$], where (1) the cost of reading from the write cloud $310_1$ when the data block is being transferred to the read cloud $310_2$ may be the same as or different than the cost that would be incurred for reading the data block from the write cloud $310_1$ for transmission to end user device 320 (denoted herein as $r_1$) and, similarly, (2) the cost of writing to the read cloud $310_2$ when the data block is being transferred to the read cloud $310_2$ may be the same as or different than the cost that would be incurred for writing the data block to the read cloud $310_2$ when the writing of the data block is initiated by the end user device 320 (denoted herein as $w_2$). Again, It should be appreciated that, in the expression f=[cost of reading from the write cloud $310_1$+cost of writing to the read cloud $310_2$], the cost of reading and cost of writing may include any cost components which may be associated with such operations (e.g., I/O costs, computing costs, bandwidth costs, or the like, as well as various combinations thereof).

It should be appreciated that, although primarily depicted and described with respect to embodiments in which three different clouds (illustratively, clouds 310) are used to host the three components of the MCFS, in at least one embodiment fewer or more clouds 310 may be used to host the three components of the MCFS. In some embodiments, the write cache and the read cache of the MCFS may be combined and implemented using a single cloud (i.e., using a single cloud service of a single CSP), such as where the lowest write costs and read costs are provided by a single CSP. In some embodiments, more than three clouds may be used to host the three components of the MCFS (e.g., where one or more of the components of the MCFS is provided using two or more clouds), such as where two CSPs have identical or nearly identical read costs such that the two clouds of the two CSPs may be used to serve read requests from different geographic regions for performance reasons. It should be appreciated that other arrangements are contemplated.

It should be appreciated that separation of the file system components using multiple clouds provides various advantages. The separation of the file system gives flexibility in moving the write cache and the read cache between clouds, even if the disk is unable to be moved. In general, the caches are designed to hold only the working set of data blocks, which is typically quite small compared to the total size of the disk (e.g., less than 1% in many cases), and, therefore, each of the caches can be independently migrated between clouds if needed or desired. Additionally, it is expected that, in most cases, a cache will be able to be migrated relatively quickly due to its relatively small size. The separation of the file system also supports optimizations for more common cases. In many file systems, data blocks are mainly read or mainly written and, further, recently read data is re-read often and recently written data is overwritten often. Similarly, in many file systems, reading and writing of the same data block is relatively rare (although it still needs to be accounted for). In view of the foregoing points, it is expected that separation of the file system using multiple clouds (e.g., mapping the cheapest write service to the write cache, the cheapest read service to the read cache, and the cheapest storage service to the disk) tends to result in significant cost savings.

It should be appreciated that, although primarily depicted and described with respect to embodiments in which storage types are assigned to clouds based on the costs of those storage types at those clouds (e.g., providing a write cache using a cloud service/CSP having a lowest write cost (of the set of potential cloud services/CSPs), providing a read cache using a cloud service/CSP having a lowest read cost (of the set of potential cloud services/CSPs), and providing a disk using a cloud service/CSP having a lowest storage cost (of the set of potential cloud services/CSPs), in at least one embodiment the MCFS may be configured based on assignment of operation types to clouds based on costs for those operation types, respectively. In other words, rather than providing a MCFS that is workload agnostic, in at least one embodiment the MCFS may be configured based on the underlying workload.

As noted herein, various capabilities are provided for reducing one or more costs related to use of clouds (e.g., reducing the costs of data transfers for cloud applications based on pricing heterogeneity as depicted and described with respect to FIG. 1-FIG. 2, reducing the costs of cloud storage in cloud-based file systems based on pricing heterogeneity as depicted and described with respect to FIG. 3-FIG. 7, or the like, as well as various combinations thereof). A general method associated with such embodiments is depicted and described with respect to FIG. 8.

Figure 8:
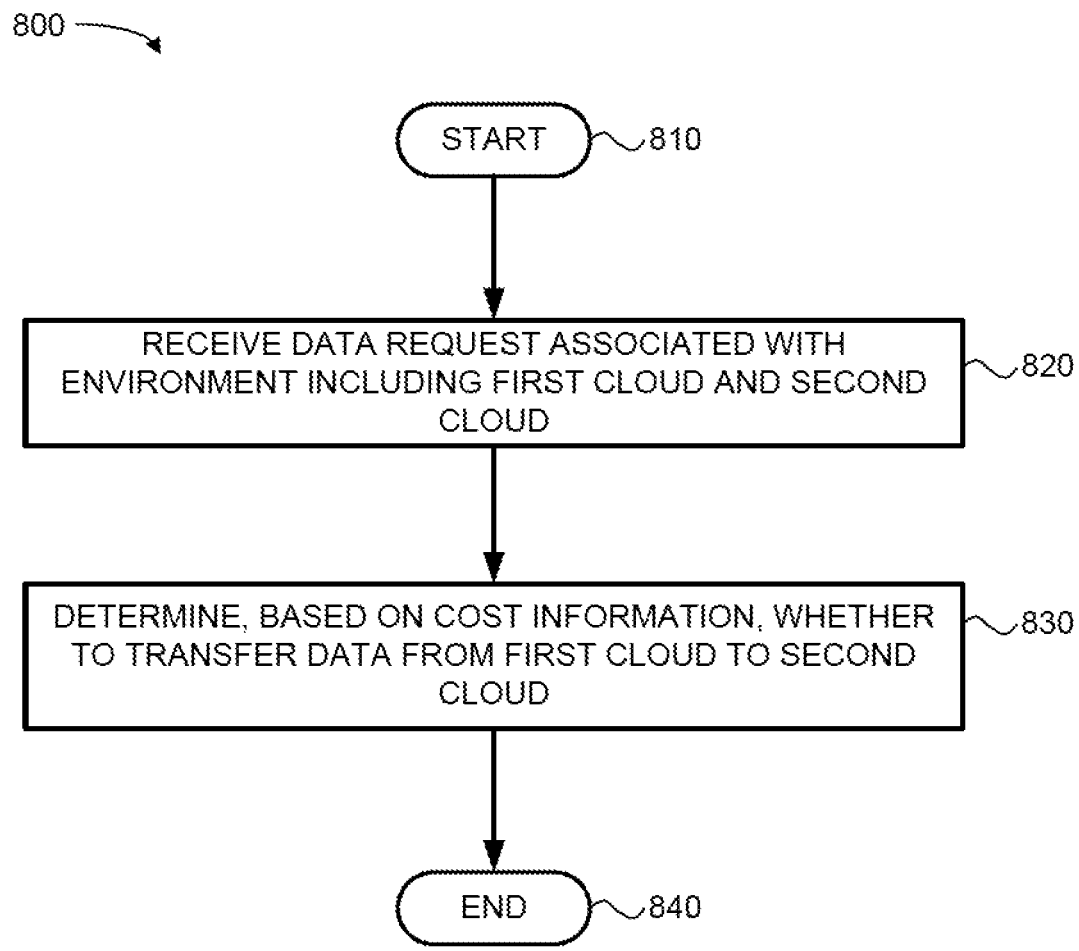
FIG. 8 depicts one embodiment of a method for reducing one or more costs associated with using multiple clouds for transferring data in a cloud-based environment.

FIG. 8 depicts one embodiment of a method for reducing one or more costs associated with using multiple clouds for transferring data in a cloud-based environment. It should be appreciated that, although primarily depicted and described herein as being performed serially, at least a portion of the steps of method 800 may be performed contemporaneously or in a different order than presented in FIG. 8. At step 810, method 800 begins. At step 820, a data request is received. The data request is associated with an environment including a first cloud and a second cloud. In some embodiments, the data request may be a read request for data maintained at the first cloud, where the read request may be served directly from the first cloud or indirectly via the second cloud (e.g., such as where the first cloud hosts an application and application data is to be provided from the application in the first cloud to an end user device). In some embodiments, the data request may be a write request for data intended for the second cloud, where the write request may be provided directly to the second cloud or may be provided to the second cloud indirectly via the first cloud (e.g., such as where the second cloud hosts an application and application data is to be provided from an end user device to the application in the second cloud). In some embodiments, the data request may be a read request for data maintained at the first cloud where the first cloud supports a write cache and the second cloud supports a read cache. At step 830, a determination is made as to whether or not to transfer data specified by the data request from the first cloud toward the second cloud. This is a cost-based determination that may be directly or indirectly based on one or more costs associated with the first cloud or one or more costs associated with the second cloud. At step 840, method 800 ends. It should be appreciated that the operation of method 800 may be better understood when read in conjunction with FIGS. 1-2 or FIGS. 3-7.

In the embodiments of FIGS. 1-2, for example, the data request may be a request to retrieve application data from an application hosted in the first cloud. Here, the cost-based determination may be a comparison of a cost of providing the application data to the requesting end user device directly without using the second cloud or indirectly via the second cloud. These embodiments will be better understood by way of reference to FIGS. 1-2.

In the embodiments of FIGS. 3-7, for example, the data request may be a request related to a file system maintained using the first cloud and the second cloud (e.g., where the first cloud maintains a write cache for the file system and the second cloud maintains a read cache for the file system). The request may be a read request or a write request. Here, the cost-based determination may be a determination as to when to transfer a data block from the write cache to the read cache based on cost information associated with the clouds in which the write cache and read cache are hosted, a determination as to when to serve requests for data blocks from the write cache and when to serve requests for data blocks from the read cache, or the like, as well as various combinations thereof.

It should be appreciated that, although primarily depicted and described herein with respect to embodiments in which the client device is an end user device (illustratively, end user device 120 and end user device 320), It should be appreciated that other types of client devices may send requests associated with data blocks of the MCFS. For example, devices such as servers, processors, or the like may initiate data block read requests and data block write requests. Thus, in at least some embodiments, various references herein to end user devices may be read more generally as being client devices (e.g., any device suitable for operating as a client of the file system).

Figure 9:
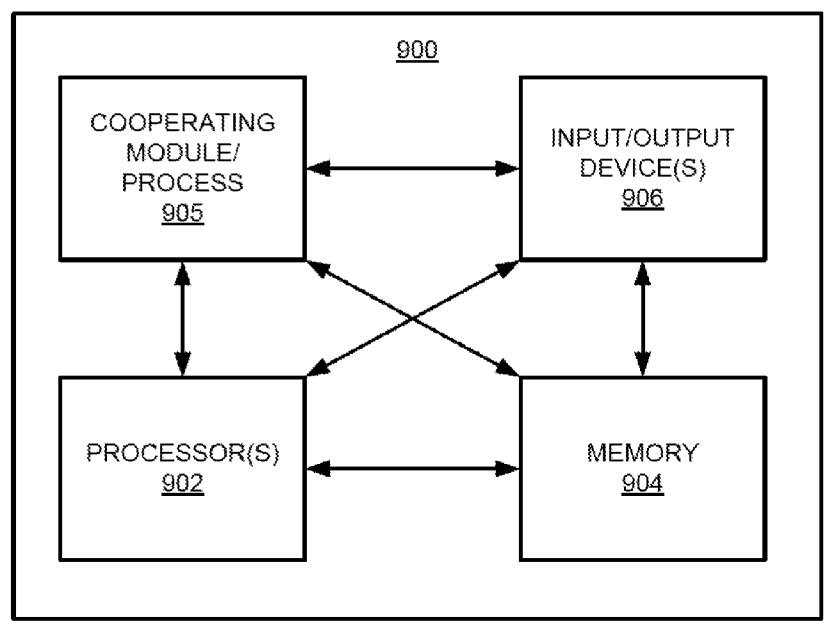
FIG. 9 depicts a high-level block diagram of a computer suitable for use in performing functions described herein.

FIG. 9 depicts a high-level block diagram of a computer suitable for use in performing functions described herein.

The computer 900 includes a processor 902 (e.g., a central processing unit (CPU) and/or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein and/or portions of functional elements described herein. For example, the computer 900 provides a general architecture and functionality suitable for implementing one or more of application 112, cloud resources 113, cloud resources 114, end user device 120, application data transfer control system 130, one or more elements of cloud $310_1$, write cache 312, one or more elements of cloud $310_2$, read cache 314, one or more elements of cloud $310_3$, disk 316, end user device 320, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It should be appreciated that the term "or" as used herein refers to a non-exclusive "or," unless otherwise indicated (e.g., "or else" or "or in the alternative").

It should be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive, from a user device, a read request for a data block of a cloud-based file system, wherein the cloud-based file system comprises a read cache and a write cache, wherein the read request is received at the read cache; and
propagate, from the read cache toward the write cache based on a determination that the data block is not available from the read cache, a lease request indicative of a request by the read cache for the write cache to provide the read cache with an invalidate update message each time that the data block is updated at the write cache.

2. The apparatus of claim 1, wherein the processor is configured to:
receive, by the read cache from the write cache, a lease response indicative as to whether the data block is stored in the write cache.

3. The apparatus of claim 2, wherein the processor is configured to:
    based on a determination that the data block is stored in the write cache:
        propagate, toward the user device, a message for instructing the user device to read the data block from the write cache.
4. The apparatus of claim 2, wherein the processor is configured to:
    based on a determination that the data block is not stored in the write cache:
        retrieve the data block from a disk of the cloud-based file system; and
        propagate the data block toward the user device.
5. The apparatus of claim 1, wherein the processor is configured to:
    receive, by the read cache from the write cache, a request to invalidate the data block at the read cache; and
    mark the data block in a manner for indicating that at least a next request for the data block is to be served from the write cache.
6. The apparatus of claim 5, wherein the processor is configured to:
    receive, from the user device, a next read request for the data block; and
    propagate, toward the user device, a message for instructing the user device to request the data block from the write cache.
7. The apparatus of claim 1, wherein the processor is configured to:
    receive, by the read cache from the write cache, a request to update the data block; and
    update the data block based on the request to update the data block.
8. The apparatus of claim 7, wherein the processor is configured to:
    receive, from the user device, a next read request for the data block; and
    propagate the data block from the read cache toward the user device.
9. A method, comprising:
    receiving, by a processor from a user device, a read request for a data block of a cloud-based file system, wherein the cloud-based file system comprises a read cache and a write cache, wherein the read request is received at the read cache; and
    propagating, from the read cache toward the write cache based on a determination that the data block is not available from the read cache, a lease request indicative of a request by the read cache for the write cache to provide the read cache with an invalidate update message each time that the data block is updated at the write cache.
10. The method of claim 9, further comprising:
    receiving, by the read cache from the write cache, a lease response indicative as to whether the data block is stored in the write cache.
11. The method of claim 10, further comprising:
    based on a determination that the data block is stored in the write cache:
        propagating, toward the user device, a message for instructing the user device to read the data block from the write cache.
12. The method of claim 10, further comprising:
    based on a determination that the data block is not stored in the write cache:
        retrieving the data block from a disk of the cloud-based file system; and
        propagating the data block toward the user device.
13. The method of claim 9, further comprising:
    receiving, by the read cache from the write cache, a request to invalidate the data block at the read cache; and
    marking the data block in a manner for indicating that at least a next request for the data block is to be served from the write cache.
14. The method of claim 13, further comprising:
    receiving, from the user device, a next read request for the data block; and
    propagating, toward the user device, a message for instructing the user device to request the data block from the write cache.
15. The method of claim 9, further comprising:
    receiving, by the read cache from the write cache, a request to update the data block; and
    updating the data block based on the request to update the data block.
16. The method of claim 15, further comprising:
    receiving, from the user device, a next read request for the data block; and
    propagating the data block from the read cache toward the user device.

* * * * *